United States Patent
Jalil

(10) Patent No.: US 10,462,035 B2
(45) Date of Patent: Oct. 29, 2019

(54) USING CONTROL INFORMATION TO PROCESS DATA ASSOCIATED WITH AN UNSUPPORTED PROTOCOL

(71) Applicant: Verizon Patent and Licensing Inc., Arlington, VA (US)

(72) Inventor: Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 15/222,143

(22) Filed: Jul. 28, 2016

(65) Prior Publication Data
US 2018/0034942 A1    Feb. 1, 2018

(51) Int. Cl.
| | |
|---|---|
| H04L 29/06 | (2006.01) |
| H04L 12/66 | (2006.01) |
| H04L 12/26 | (2006.01) |
| H04L 12/24 | (2006.01) |
| H04L 12/931 | (2013.01) |

(52) U.S. Cl.
CPC .......... *H04L 43/18* (2013.01); *H04L 41/0893* (2013.01); *H04L 69/18* (2013.01); *H04L 41/0213* (2013.01); *H04L 49/503* (2013.01)

(58) Field of Classification Search
CPC ..... H04L 69/08; H04L 12/66; H04L 41/0213; H04L 67/40
USPC ........................................................ 709/217
See application file for complete search history.

(56) References Cited

U.S. PATENT DOCUMENTS

| | | | | |
|---|---|---|---|---|
| 7,774,832 | B2* | 8/2010 | Poling | H04L 63/0227 709/224 |
| 2006/0272019 | A1* | 11/2006 | Addepalli | G06F 21/554 726/23 |
| 2011/0246762 | A1* | 10/2011 | Adams | H04L 51/066 713/150 |
| 2011/0255540 | A1* | 10/2011 | Mizrahi | H04L 45/00 370/392 |
| 2017/0054622 | A1* | 2/2017 | Mishra | H04L 1/22 |
| 2018/0063598 | A1* | 3/2018 | Kwak | H04L 67/02 |

OTHER PUBLICATIONS

Wikipedia, "Software-defined networking," https://en.wikipedia.org/wiki/Software-defined_networking, Jul. 26, 2016, 9 pages.
Rouse et al., "SDN controller (software-defined networking controller)," http://searchsdn.techtarget.com/definition/SDN-controller-software-defined-networking-controller, Nov. 18, 2012, 4 pages.
(Continued)

*Primary Examiner* — Kevin T Bates
*Assistant Examiner* — Nazia Naoreen

(57) ABSTRACT

A device may receive, from a source, data destined for a destination. The device may identify a protocol associated with the data. The protocol may be used to transmit the data. The device may determine whether the protocol is unsupported by the device. The device may identify control information, associated with the protocol, based on determining that the protocol is unsupported by the device. The control information may identify an action, to perform on the data, other than dropping the data. The device may perform the action based on the control information.

20 Claims, 7 Drawing Sheets

(56) References Cited

OTHER PUBLICATIONS

OpenDaylight Project, "What are SDN Controllers (or SDN Controllers Platforms)?," https://www.sdxcentral.com/sdn/definitions/sdn-controllers/, Apr. 8, 2013, 6 pages.
Wikipedia, "Communications protocol," https://en.wikipedia.org/wiki/Communications_protocol#A_basis_for_protocol_design, Jul. 13, 2016, 16 pages.

* cited by examiner

USING CONTROL INFORMATION TO PROCESS DATA ASSOCIATED WITH AN UNSUPPORTED PROTOCOL

BACKGROUND

Communications protocols may be formal descriptions of message formats, rules, and/or standards that are used to exchange data between devices communicating in a network. The message formats, rules, and/or standards may define syntax, semantics, and/or synchronization of communications between the devices, for the purpose of message authentication, error detection and correction, and/or signaling between the devices in the network, for example.

DETAILED DESCRIPTION OF PREFERRED EMBODIMENTS

The following detailed description of example implementations refers to the accompanying drawings. The same reference numbers in different drawings may identify the same or similar elements.

Protocols used by one or more network device vendors may be unsupported by a network provider. If protocols used by one or more network device vendors are unsupported by a network provider, then the network provider may have to configure and/or develop a different set of protocols for each network device vendor used by the network provider. Having to configure and/or develop a different set of protocols for each network device vendor may consume significant processing resources and may be inefficient. This may be the case where a particular protocol is used by a single network device vendor and/or where the network provider or the network device vendor has plans to cease using the protocol.

Implementations described herein enable a network gateway to apply a set of rules to data associated with unsupported protocols. Applying the set of rules may reduce and/or eliminate the need for a network provider to configure network devices and/or to develop software and/or a technical standard for each protocol used by a network device vendor. Reducing or eliminating the need for configuration and/or development for each protocol conserves processing resources by reducing or eliminating configuration and/or development associated with enabling the network gateway to transmit and/or receive data associated with different protocols. In addition, using the set of rules to process data (e.g., rather than processing data according to a protocol) conserves processing resources of the network gateway by reducing a quantity of operations that the network gateway has to perform when transmitting and/or receiving the data. Further, using the set of rules to process data may improve an efficiency of transmitting the data by enabling the network gateway to transmit data associated with an unsupported protocol (e.g., rather than dropping the data upon receipt).

FIGS. 1A-1D are diagrams of an overview of an example implementation 100 described herein. In example implementation 100, a network gateway may receive, from a source, data destined for a destination.

Figure 1A:
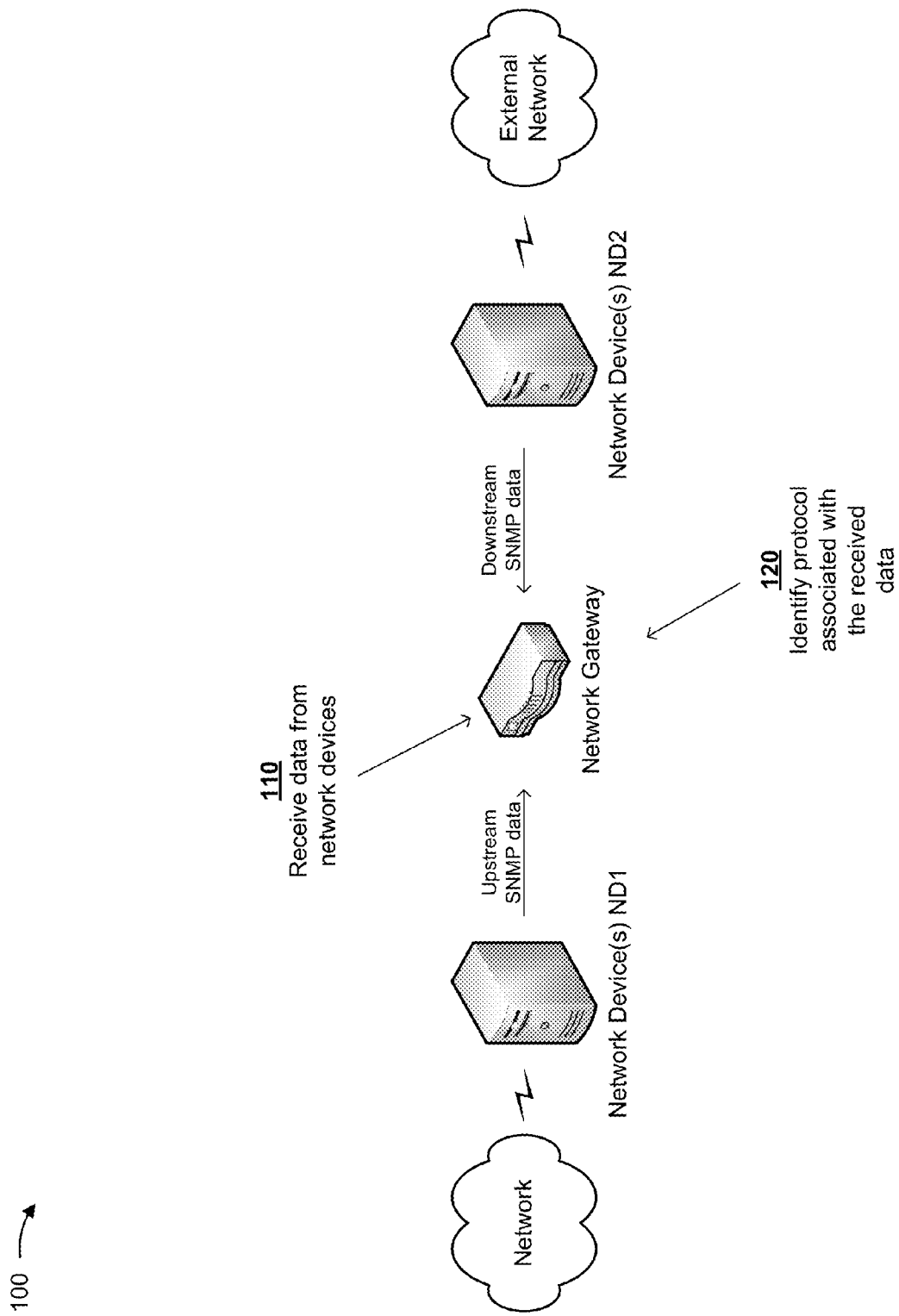
FIGS. 1A-1D are diagrams of an overview of an example implementation described herein.

As shown by FIG. 1A, and by reference number 110, a network gateway may receive data from network device(s). For example, the network gateway may receive upstream Simple Network Management Protocol (SNMP) data from a network device(s) ND1 destined for network device(s) ND2. The network gateway also may receive downstream SNMP data from network device(s) ND2 destined for network device(s) ND1. In some cases, downstream data may be described as upstream data and upstream data may be described as downstream data. In addition, downstream data and/or upstream data may be described as data in a first direction or data in a second direction (e.g., rather than being described as downstream data or upstream data).

As shown by reference number 120, the network gateway may identify a protocol associated with the received data. For example, the network gateway may identify SNMP as the protocol associated with the data received from network device(s) ND1 and SNMP as the protocol associated with the data received from network device(s) ND2.

Figure 1B:
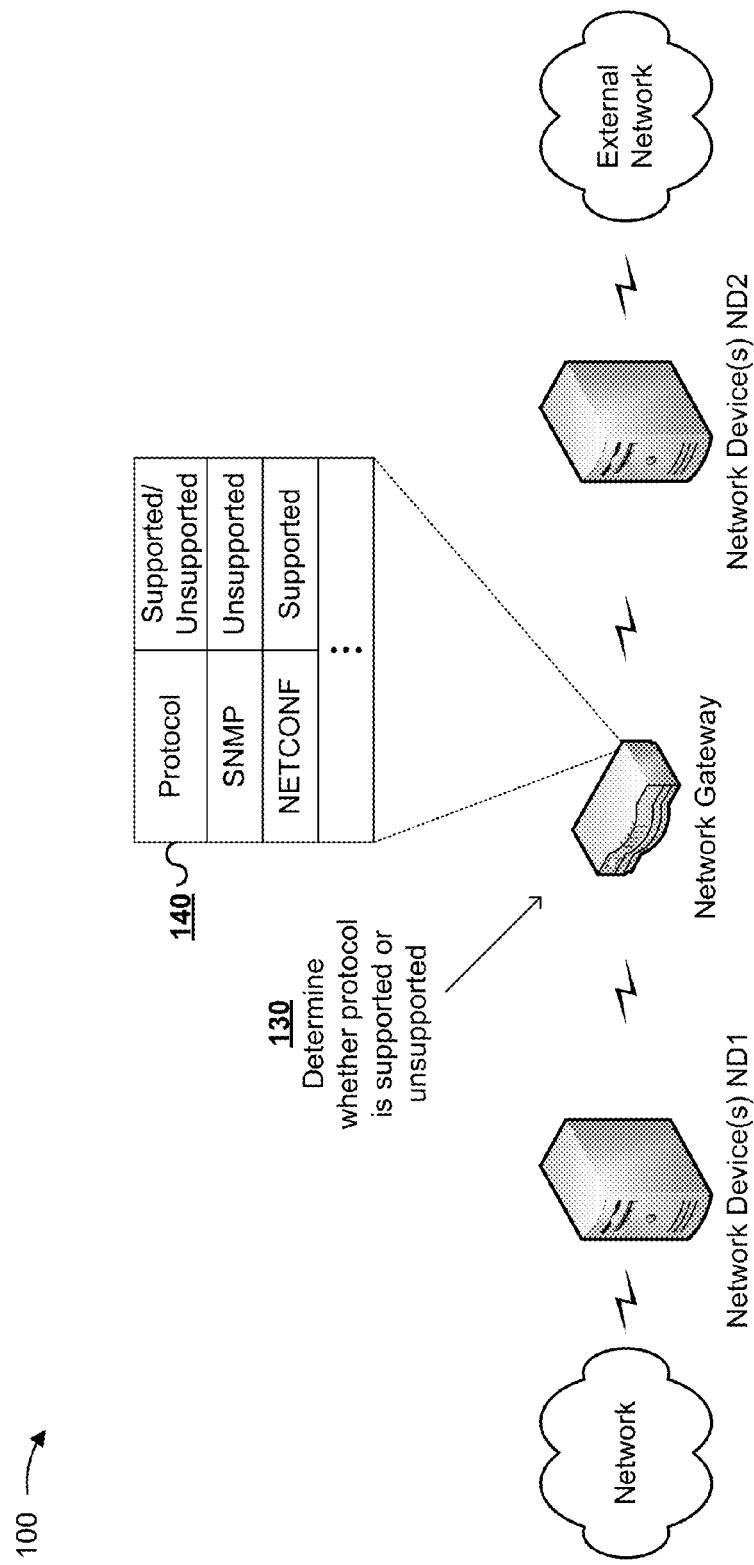

As shown by FIG. 1B, and by reference number 130, the network gateway may determine whether the protocol associated with the data received is supported or unsupported by the network gateway. As shown by reference number 140, assume that the network gateway determines that SNMP is unsupported by the network gateway and the NETCONF protocol is supported by the network gateway.

Figure 1C:
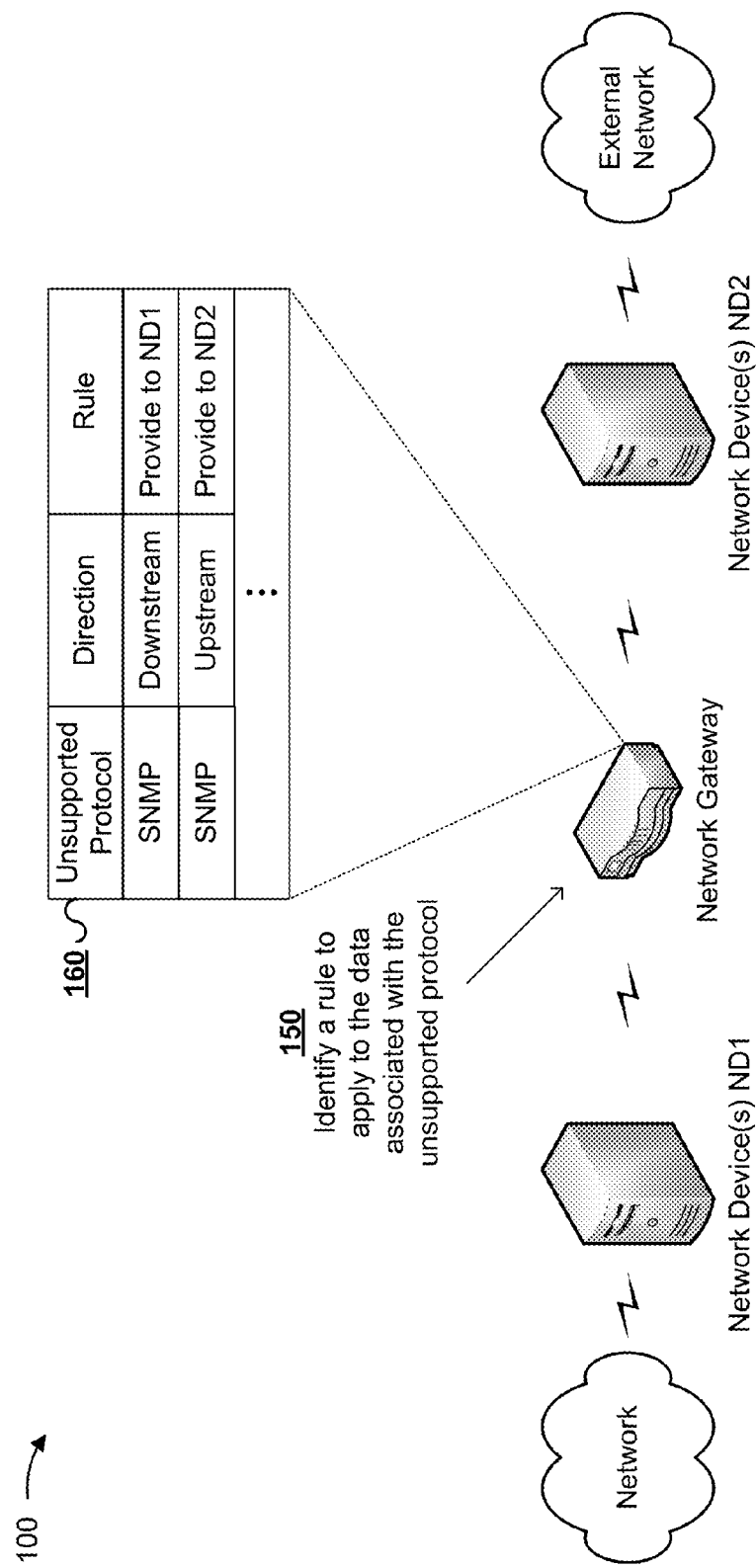

In some implementations, the network gateway may identify control information, associated with the protocol, that identifies an action to be performed based on the protocol being unsupported by the network gateway. For example, as shown by FIG. 1C, and by reference number 150, the network gateway may identify control information in the form of a rule to apply to the data associated with the unsupported protocol. As shown by reference number 160, the rule to apply to the unsupported downstream SNMP data may include providing the unsupported downstream SNMP data to network device(s) ND1. Also as shown by reference number 160, the rule to apply to the unsupported upstream SNMP data may include providing the unsupported SNMP data to network device(s) ND2. So rather than simply dropping the SNMP data because SNMP is unsupported by the network gateway, the network gateway may perform an action, with regard to the SNMP data, based on a stored rule. This conserves network resources by reducing a need for data to be retransmitted after the data is dropped during transmission.

Figure 1D:
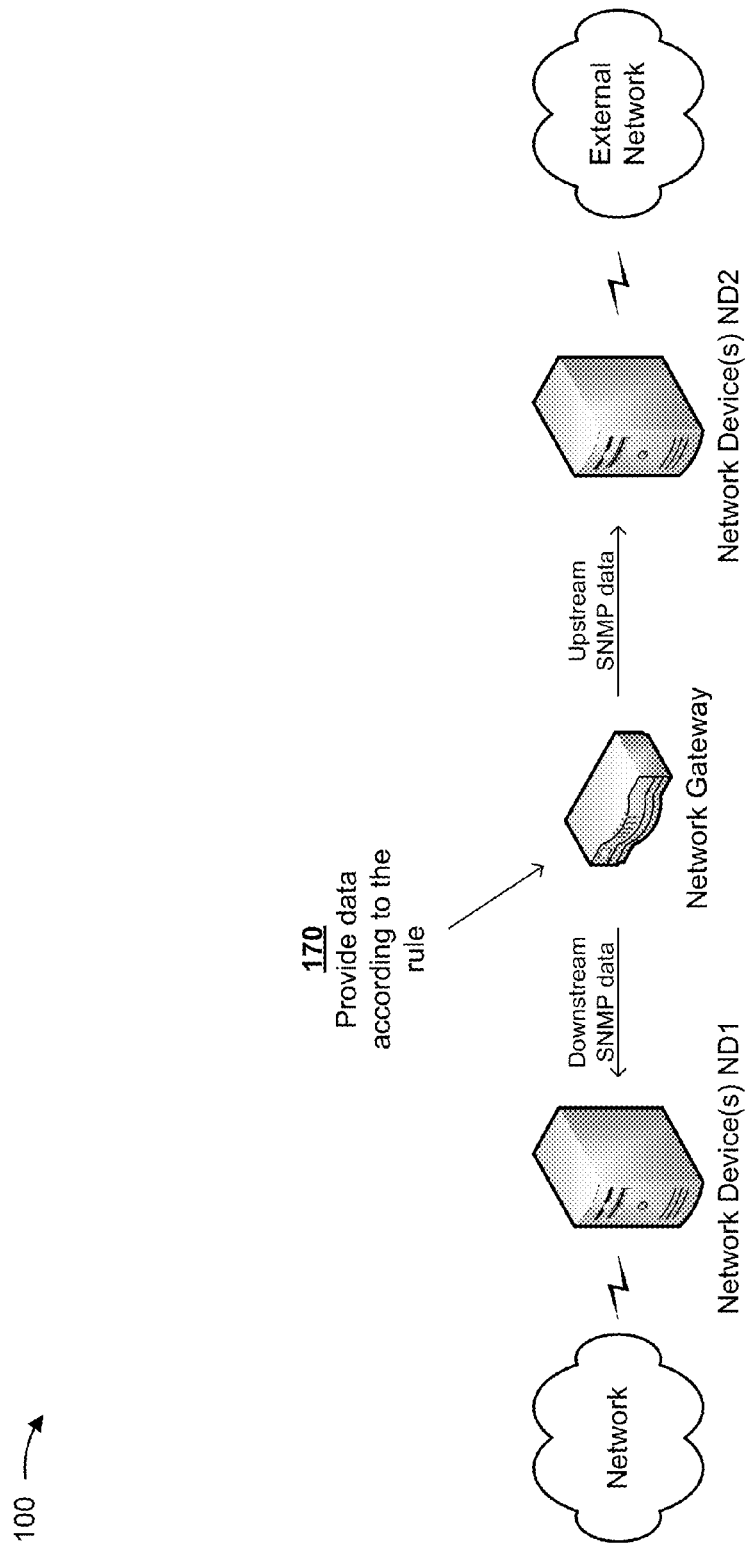

In some implementations, the network gateway may perform the action based on identifying the control information. For example, as shown by FIG. 1D, and by reference number 170, the network gateway may process the data according to the rule. For example, the network gateway may provide the downstream SNMP data to network device(s) ND1 and the upstream SNMP data to network device(s) ND2.

In this way, the need for a network provider to configure devices and/or to develop software and/or a technical standard for each protocol used by a network device vendor may be reduced or eliminated. Reducing or eliminating the need for configuration and/or development for each protocol may conserve processing resources by reducing or eliminating configuration and/or development associated with enabling the network gateway to transmit and/or receive data associated with different protocols. In addition, using the set of rules to process data (e.g., rather than processing data according to a protocol) conserves processing resources of the network gateway by reducing a quantity of operations that the network gateway has to perform when transmitting and/or receiving the data. Further, using the set of rules to process data may improve an efficiency of transmitting the data by enabling the network gateway to transmit data associated with an unsupported protocol (e.g., rather than dropping the data upon receipt).

As indicated above, FIGS. 1A-1D are provided merely as an example. Other examples are possible and may differ from what was described with regard to FIGS. 1A-1D.

Figure 2:
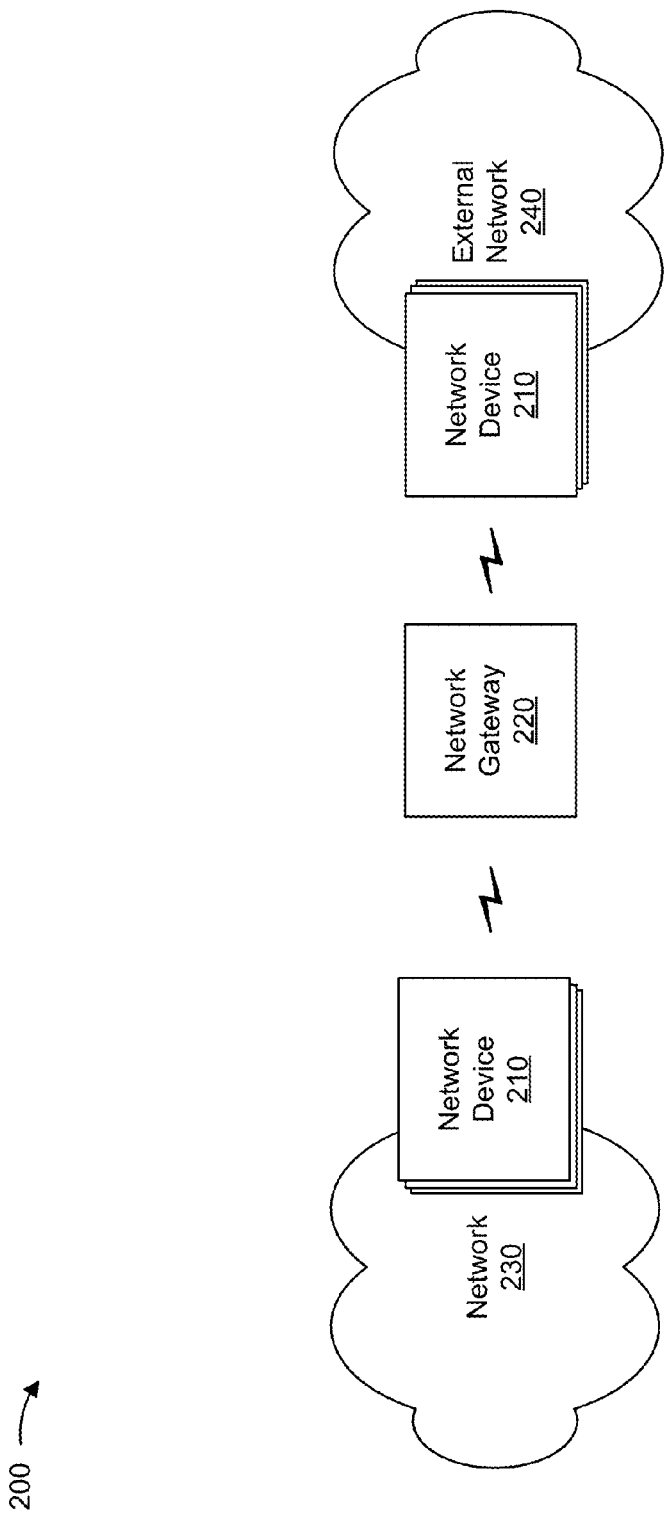
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210 (hereinafter referred to collectively as "network devices 210," and individually as "network device 210"), a network gateway 220, a network 230, and an external network 240. Devices of environment 200 may interconnect via wired connections, wireless connections, or a combination of wired and wireless connections.

Network device 210 includes one or more devices capable of receiving, providing, storing, generating, and/or processing information. For example, network device 210 may include a router, a switch, a firewall, a bridge, a hub, a gateway, a server (e.g., a proxy server, a web server, a host server, a storage server, a server in a data center or a cloud computing environment, etc.), a reverse proxy, a security device, an intrusion detection device, a load balancer, or a similar type of device. In some implementations, network device 210 may provide data to network gateway 220 using a communication protocol and different network devices 210 (e.g., different network devices 210 of different vendors) may use different protocols to provide data to network gateway 220, as described in more detail elsewhere herein. Additionally, or alternatively, network device 210 may receive data from network gateway 220, as described in more detail elsewhere herein.

Network gateway 220 includes one or more devices capable of receiving, providing, storing, generating, and/or processing information. For example, network gateway 220 may include a data processing and/or traffic transfer device, such as a gateway (e.g., a software-defined network (SDN) gateway, an evolved packet data gateway (ePDG), etc.), a router, a modem, a switch, a firewall, a network interface card (NIC), a virtual private network (VPN) concentrator, an optical add-drop multiplexer (OADM), a bridge, a hub, a server (e.g., a proxy server, a web server, a host server, a storage server, a server in a data center or a cloud computing environment, etc.), a reverse proxy, or a similar type of device that processes and/or transfers traffic. In some implementations, network gateway 220 may receive data, communicated using a protocol, from network device 210, as described in more detail elsewhere herein. Additionally, or alternatively, network gateway 220 may determine whether the protocol, associated with the data, is supported or unsupported by network gateway 220 and may process the data based on determining whether the protocol is supported or unsupported, as described in more detail elsewhere herein.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

External network 240 includes one or more wired and/or wireless networks. For example, external network 240 may include a cellular network (e.g., an LTE network, a 3G network, a CDMA network, etc.), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, external network 240 is a different network, or a different type of network, than network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
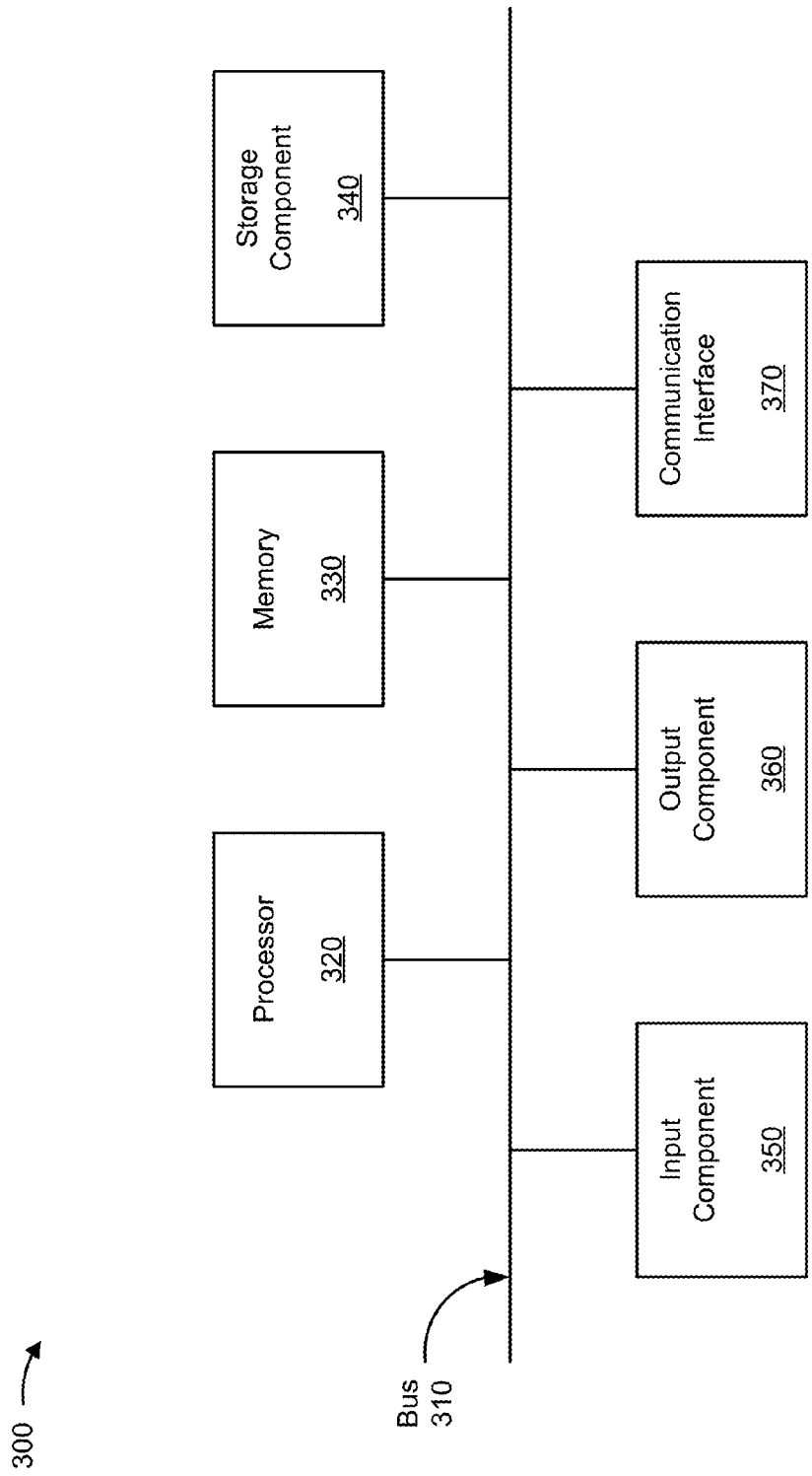
FIG. 3 is a diagram of example components of one or more devices of FIG. 2.

FIG. 3 is a diagram of example components of a device 300. Device 300 may correspond to network device 210 or network gateway 220. In some implementations, network device 210 or network gateway 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
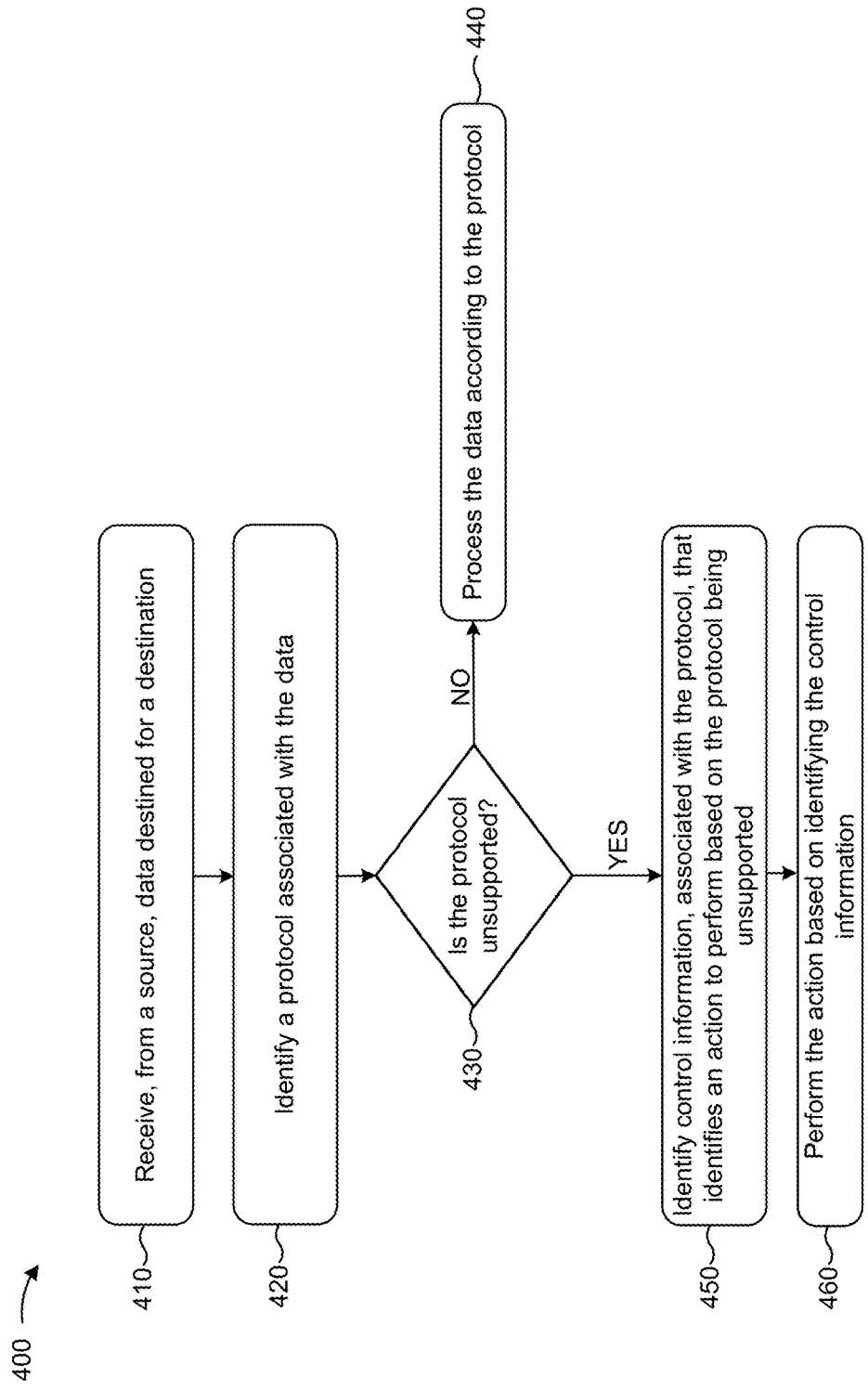
FIG. 4 is a flow chart of an example process for using control information to process data associated with an unsupported protocol.

FIG. 4 is a flow chart of an example process 400 for using control information to process data associated with an unsupported protocol. In some implementations, one or more process blocks of FIG. 4 may be performed by network gateway 220. In some implementations, one or more process blocks of FIG. 4 may be performed by another device or a group of devices separate from or including network gateway 220, such as network device 210.

As shown in FIG. 4, process 400 may include receiving, from a source, data destined for a destination (block 410). For example, network gateway 220 may receive data from a first network device 210 (e.g., network device 210 associated with network 230 or external network 240). In some implementations, the data may be destined for a second network device 210 (e.g., network device 210 associated with network 230 or external network 240).

In some implementations, network gateway 220 may receive data transmitted from and/or destined for an application of network device 210. For example, the application may include an application installed on network device 210 or executing on network device 210. Additionally, or alternatively, network gateway 220 may receive data transmitted from and/or destined for software of network device 210. For example, the software may include orchestration software, open-source software, or the like. Additionally, or alternatively, network gateway 220 may receive data from and/or destined for a user interface associated with network device 210. For example, the user interface may include a user interface provided for display by network device 210.

In some implementations, data may include downstream data. For example, downstream data may include data transmitted from a first network device 210, associated with external network 240, and destined for a downstream destination, such as a second network device 210, associated with network 230. As another example, downstream data may include data transmitted from a network device 210, of a network device vendor associated with external network 240, destined for a network device 210 of a network provider associated with network 230.

In some implementations, downstream data may include commands. For example, the downstream data may include commands transmitted from a first network device 210, associated with external network 240, to a second network device 210, associated with network 230 (e.g., commands to cause the second network device 210 to perform an action, commands for troubleshooting, etc.). Alternatively, and/or additionally, downstream data may include other data. For example, the downstream data may include data transmitted from a first network device 210, associated with external network 240, to a user interface, an application, software, or the like, of a second network device 210 associated with network 230.

In some implementations, data may include upstream data. For example, upstream data may include data transmitted from a first network device 210, associated with network 230, destined for a upstream destination, such as a second network device 210 associated with external network 240. As another example, the upstream data may include data transmitted from a network provider, associated with network 230, destined for a network device vendor, associated with external network 240.

In some implementations, the upstream data may include commands. For example, the upstream data may include commands transmitted from a first network device 210, associated with network 230, destined for a second network device 210 associated with external network 240. Alternatively, and/or additionally, the upstream data may include other data. For example, the upstream data may include data transmitted from a first network device 210, associated with network 230, destined for a user interface, an application, software, or the like, of a second network device 210 associated with external network 240.

As further shown in FIG. 4, process 400 may include identifying a protocol associated with the data (block 420). For example, network gateway 220 may identify a network configuration protocol (NETCONF), a Border Gateway Protocol (BGP), a Path Computation Element Protocol (PCEP), an SNMP protocol, a Hypertext Transfer Protocol (HTTP), a Syslog protocol, an OpenFlow protocol, or another type of protocol associated with the data that is used to process, transmit, or provide the data. In some implementations, network gateway 220 may identify the protocol based on network gateway 220 receiving the data.

In some implementations, network gateway 220 may identify the protocol based on information included in one or more packets of the data. For example, a packet may include 5-tuple information, such as a source IP address, a destination IP address, a source port identifier, a destination port identifier, and a protocol identifier. In some implementations, network gateway 220 may parse this 5-tuple information to identify the protocol based on the protocol identifier. In some implementations, the protocol identifier may be stored in a particular field of the packet, and network gateway 220 may parse the packet to identify the particular field (e.g., by searching for the field, by identifying a known location within the packet where the particular field is stored, etc.). After identifying the particular field where the protocol identifier is stored, network gateway 220 may extract the protocol identifier from the particular field.

Additionally, or alternatively, network gateway 220 may identify the protocol based on a port identifier (e.g., a source port identifier and/or or a destination port identifier). For example, communications that use a particular protocol may use a particular port or ports to communicate using the protocol. In this case, network gateway 220 may extract port identifier(s) from a source port field and/or a destination port field of a packet, and may identify the protocol using a data structure that identifies port identifiers (e.g., source port numbers or destination port numbers) and associated protocols. In some implementations, network gateway 220 may identify the protocol by performing a comparison of port identifiers. For example, network gateway 220 may perform a comparison of a port identifier associated with the data and the port identifiers identified by the data structure. In some implementations, network gateway 220 may identify the protocol associated with the data where the comparison indicates a match. For example, network gateway 220 may identify the protocol where the comparison indicates a match between a port identifier associated with the data and a port identifier identified by the data structure.

Additionally, or alternatively, network gateway 220 may identify the protocol using a protocol identifier (e.g., as described above). For example, network gateway 220 may identify the protocol by identifying a protocol identifier included in the data (e.g., included in a packet header of a packet used to transport the data), such as by extracting the protocol identifier from a protocol field of a packet. In some implementations, network gateway 220 may perform the comparison using the protocol identifier (e.g., rather than using a port identifier).

In some implementations, network gateway 220 may identify different protocols for different data. For example, network gateway 220 may identify the protocol for downstream data as HTTP and that the protocol for upstream data as SNMP. As another example, network gateway 220 may identify HTTP as the protocol for first upstream data and SNMP as the protocol for second upstream data. As another example, network gateway 220 may identify the protocol for first data received from a first network device 210 as HTTP and the protocol for second data received from a second network device 210 as SNMP. As another example, network device 210 may identify the protocol for first data received from a first network device 210 as HTTP and the protocol for second data received from the first network device 210 as SNMP.

In some implementations, network gateway 220 may fail to identify the protocol for the data. For example, network gateway 220 may fail to identify the protocol based on the protocol not being identified by the data structure or the protocol identifier being unrecognized by network gateway 220. In some implementations, network gateway 220 may perform an action when network gateway 220 fails to identify a protocol. For example, when network gateway 220 fails to identify a protocol for downstream data and/or upstream data, network gateway 220 may transmit the data to a default destination, notify a network administrator, send an error message to network device 210, drop the data in association with notifying the network administrator or sending the error message, or the like.

In some implementations, network gateway 220 may identify a communication session associated with the data (e.g., rather than identifying a protocol being used). For example, network gateway 220 may identify a dialogue, a conversation, or a session between two or more network devices 210. In some implementations, network gateway 220 may use a session identifier (e.g., a session token), included in one or more packets transmitted between network devices 210, to identify the communication session. For example, network gateway 220 may extract the session identifier from a particular field of the packet. This enables network gateway 220 to perform actions on a per communication session basis (e.g., rather than for all usage of a particular protocol), thereby conserving processing resources of network gateway 220 by reducing a quantity of actions network gateway 220 performs, as described below. For example, a rule for a protocol may be applied to a particular network device 210 (e.g., based on a source IP address or destination IP address of network device 210 being included in a packet) and/or a particular communication session (e.g., based on a session identifier included in the packet), rather than being applied to all network devices 210 and communication sessions that use the protocol.

As further shown in FIG. 4, process 400 may include determining whether the protocol is unsupported (block 430). For example, network gateway 220 may determine whether the protocol is unsupported by network gateway 220 or supported by network gateway 220. In some implementations, network gateway 220 may determine whether the protocol is unsupported based on identifying the protocol. In some implementations, network gateway 220 may store a list of supported protocols, and may determine that the protocol is not included in the list. Additionally, or alternatively, network gateway 220 may store a list of unsupported protocols, and may determine that the protocol is included in the list.

In some implementations, network gateway 220 may determine whether the protocol is unsupported by network gateway 220 based on whether network gateway 220 is configured to use the protocol (e.g., is configured with software to permit communication using the protocol, is configured to handle the protocol, etc.). For example, network gateway 220 may determine that the protocol is unsupported by network gateway 220 based on determining that network gateway 220 has not been configured to communicate using the protocol. As another example, network gateway 220 may determine that the protocol is supported by network gateway 220 based on determining that network gateway 220 has been configured to communicate using the protocol. In some implementations, network gateway 220 may attempt to transmit the data (e.g., one or more packets), and may identify an error associated with the transmission. Based on the error (e.g., based on determining that an error occurred, based on a particular type of error, based on an error identifier, etc.), network gateway 220 may determine that the protocol is unsupported.

In some implementations, network gateway 220 may determine whether the protocol is unsupported by network gateway 220 based on determining whether the network provider has developed a technical standard to enable network device 210 to communicate in the network using the particular protocol. For example, network gateway 220 may determine that the protocol is unsupported by network gateway 220 based on determining that the network administrator has not developed a technical standard for the protocol (e.g., by identifying information in a data structure that indicates a lack of a technical standard, failing to automatically recognize the protocol, etc.). For example, network gateway 220 may search a data structure for a protocol identifier that identifies the protocol, and may determine whether the protocol is supported or unsupported based on searching the data structure (e.g., based on the protocol being identified in the data structure, based on the protocol not being identified in the data structure, based on the protocol being marked as supported or unsupported in the data structure, etc.). As another example, network gateway 220 may determine that the protocol is supported based on determining that the network administrator has developed a technical standard for the protocol (e.g., by identifying information in a data structure that indicates that a technical standard has been developed, automatically recognizing the protocol, etc.).

In some implementations, network gateway 220 may use a data structure that identifies a protocol and includes an identifier that identifies whether the protocol is unsupported or supported by network gateway 220. For example, network gateway 220 may perform a comparison of the protocol associated with the data and a protocol identified by the data structure. In some implementations, network gateway 220 may identify whether the protocol is unsupported or supported by network gateway 220 when the comparison indicates a match of the protocol associated with the data and a protocol identified by the data structure.

In some implementations, network gateway 220 may determine whether a communication session is unsupported by network gateway 220 (e.g., rather than determining whether a protocol is unsupported by network gateway 220). For example, network gateway 220 may use a data structure to determine whether the type of communication session (e.g., an HTTP communication session or transmission control protocol (TCP) communication session) is identified as an unsupported communication session based on information in the data structure. As another example, network gateway 220 may determine whether the communication session is unsupported by network gateway 220 based on determining whether network gateway 220 successfully identifies the particular network devices 210 that have established the communication session. For example, if network gateway 220 is unable to identify the network devices 210 from which the data is received or to which the data is destined, then network gateway 220 may determine that the protocol is unsupported.

As further shown in FIG. 4, if the protocol is not unsupported (e.g., is supported) (block 430—NO), then process 400 may include processing the data according to the protocol (block 440). For example, if the protocol is supported by network gateway 220, then network gateway 220 may process, transmit, or provide the data according to the protocol.

In some implementations, network gateway 220 may perform an action based on the protocol being supported. For example, network gateway 220 may transmit the data to a destination identified by the data (e.g., identified by a data packet) according to the protocol. As another example, network gateway 220 may perform error recovery according to the protocol, may exchange commands with network device 210 according to the protocol, may terminate a communication session with network device 210 according to the protocol, or the like.

In some implementations, network gateway 220 may log the data (e.g., "eavesdrop") in association with performing the action. For example, network gateway 220 may record the data (e.g., in a log of data), inspect the data, or the like. In some implementations, network gateway 220 may store the data locally. Additionally, or alternatively, network gateway 220 may provide the data to another device (e.g., a server), and the other device may store the data. In some implementations, network gateway 220 or the other device may store 5-tuple information associated with the data (e.g., a source IP address, a destination IP address, a source port identifier, a destination port identifier, and/or a protocol identifier), may store an indication of the rule that was triggered, may store an indication of whether the protocol is supported or unsupported by network gateway 220, may store an indication of a manner in which network gateway 220 determined that the protocol is supported or unsupported by network gateway 220, or the like. In this way, a network administrator may view the logged data to identify potential network issues.

In some implementations, network gateway 220 may perform an action based on logging the data. For example, network gateway 220 may process the data according to the protocol but may provide a notification to a network administrator about the data transmission. As another example, network gateway 220 may prevent processing according to the protocol based on the logging. This increases security of network gateway 220 and/or network device 210 by enabling network gateway 220 to prevent or alter processing of the data, or perform another action, based on the data. In some implementations, if network gateway 220 identifies data with an unknown protocol and/or an unknown source or destination, then network gateway 220 may inspect the data or may route the data to another device for inspection to determine whether the data is malicious. For example, network gateway 220 may route the data to another device (e.g., based on a rule), and the other device may inspect the data to determine whether the data is malicious. If the data is malicious, the other device may drop the data. If the data is not malicious, then the other device may route the data to a destination identified in a packet of the data.

As further shown in FIG. 4, if the protocol is unsupported (block 430—YES), then process 400 may include identifying control information, associated with the protocol, that identifies an action to perform based on the protocol being unsupported (block 450) and performing the action based on identifying the control information (block 460). For example, if the protocol is unsupported by network gateway 220, then network gateway 220 may identify a rule, a routing policy, a security policy, load balancing policy, or the like, associated with the protocol, that identifies an action to perform based on the protocol being unsupported by network gateway 220. In some implementations, network gateway 220 may perform the action identified by the control information.

In some implementations, network gateway 220 may identify control information using a data structure. For example, network gateway 220 may identify the control information using a data structure that identifies protocols and associated control information. For example, to identify control information, network gateway 220 may search the data structure using a protocol identifier, and may compare the protocol of the data and protocols identified by the data structure, and identify the control information where the comparison indicates a match.

In some implementations, network gateway 220 may identify control information based on an unsupported communication session (e.g., rather than based on an unsupported protocol). For example, network gateway 220 may identify the control information based on a type of the communication session (e.g., an HTTP session, a transmission control protocol (TCP) session, etc.). As another example, network gateway 220 may identify the control information based on the particular network devices 210, or types of network devices 210 (e.g., router, server, etc.), that have established the communication session. Identifying the control information based on the communication session may enable network gateway 220 to identify communication session specific control information. This conserves processing resources by reducing a quantity of times network gateway 220 has to identify control information (e.g., relative to identifying control information each time network gateway 220 receives data associated with a particular protocol).

In some implementations, the control information may identify an action to perform. In some implementations, the action may include transmitting the data to a destination. For example, the action may include transmitting the data to network device 210, an application of network device 210, software of network device 210, or a user interface of network device 210. Additionally, or alternatively, the action may include logging the data. For example, the action may include recording the data, inspecting the data, or the like. Logging the data in this way may increase security of network gateway 220 and/or network device 210.

Additionally, or alternatively, the action may include duplicating the data, such as to provide copies of the data to multiple network devices 210 or to store the data in log of data. Additionally, or alternatively, the action may include dropping the data, updating records based on the data, or the like. Additionally, or alternatively, the action may include reconfiguring network gateway 220 to support the unsupported protocol. For example, network gateway 220 may communicate with network device 210 to obtain software and/or applications that enable network gateway 220 to communicate using the unsupported protocol.

In some implementations, the control information may include a catchall rule. For example, the catchall rule may include a default action to perform, such as transmitting the data to a default destination, dropping the data, or the like, when network gateway 220 fails to identify control information associated with the unsupported protocol.

In some implementations, network gateway 220 may perform the action based on identifying the control information. For example, network gateway may provide downstream data to a first network device 210, associated with network 230, and may provide upstream data to a second network device 210, associated with external network 240. Additionally, and/or alternatively, network gateway 220 may log the data, transmit the data to a default destination, drop the data, update records based on the data, or the like.

In this way, network gateway 220 may process data associated with an unsupported protocol (e.g., rather than dropping the data) by using control information. Processing data associated with an unsupported protocol using control information may conserve processing resources by reducing or eliminating configuration and/or development needed to support different protocols. In addition, processing data that is associated with an unsupported protocol may improve transmission of the data by reducing or eliminating dropped data due to the data being associated with an unsupported protocol.

Further, processing data that is associated with an unsupported protocol may conserve processing resources by reducing an amount of processing of the data (e.g., relative to processing the data according to the protocol). Reducing the amount of processing may increase processing speed and/or data transfer speed, thereby enabling real-time, or near real-time, data transfers (e.g., data transfer speeds that satisfy a threshold).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein reduce or eliminate the need for a network provider to configure devices and/or to develop software and/or a technical standard for each protocol used by a network device vendor. This conserves computing resources by reducing or eliminating configuration and/or development associated with enabling the network gateway to transmit and/or receive data associated with different protocols. In addition, using control information to process data (e.g., rather than processing data according to a protocol) conserves processing resources of the network gateway by reducing a quantity of operations that the network gateway has to perform when transmitting and/or receiving the data. Further, using the control information to process data may improve an efficiency of transmitting the data by enabling the network gateway to transmit data associated with an unsupported protocol (e.g., rather than dropping the data upon receipt).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
  receive, from a source, data destined for a destination;
  identify a protocol, associated with the data, using a data structure that identifies protocols,
    the protocol being used to transmit the data;
  determine whether the protocol is unsupported by the device by searching a data structure for a protocol identifier that identifies the protocol;
  identify control information, associated with the protocol, when the protocol is unsupported by the device,
    the data being processed according to the protocol when the protocol is supported by the device, and
    the control information identifying an action, to perform on the data, other than dropping the data; and
  perform, when the protocol is unsupported by the device, the action based on the control information.

2. The device of claim 1, where the one or more processors, when determining whether the protocol is unsupported by the device, are to:
  determine whether the device can communicate using the protocol; and
  determine whether the protocol is unsupported based on determining whether the device can communicate using the protocol.

3. The device of claim 1, where the data includes:
first data transmitted in a first direction, or
second data transmitted in a second direction,
  the second direction being different from the first direction.

4. The device of claim 3, where the one or more processors, when identifying the control information, are to:
  identify first control information for the first data; and
  identify second control information for the second data,
    the second control information being different from the first control information.

5. The device of claim 1,
where the control information identifies a rule or a policy associated with the protocol, and
where the one or more processors, when performing the action, are to:
  perform the action based on the rule or the policy associated with the protocol.

6. The device of claim 1, where the action includes transmitting the data to the destination in a first direction or in a second direction.

7. The device of claim 1, where the action includes transmitting the data without processing the data according to the protocol.

8. A non-transitory computer-readable medium storing instructions, the instructions comprising:
one or more instructions that, when executed by one or more processors of a device, cause the one or more processors to:
  receive, from a first network device, data destined for a second network device;
  identify a protocol, associated with the data, using a data structure that identifies protocols;
  determine whether the protocol is unsupported by the device by searching a data structure for a protocol identifier that identifies the protocol;
  identify control information, associated with the protocol, when the protocol is unsupported by the device,
    the data being processed according to the protocol when the protocol is supported by the device;
  identify, when the protocol is unsupported by the device, an action to perform on the data, other than dropping the data, based on the control information,
    the control information further identifying a destination for the data; and
  perform, when the protocol is unsupported by the device, the action based on the control information.

9. The non-transitory computer-readable medium of claim 8, where the protocol is used to process or transmit the data received from the first network device.

10. The non-transitory computer-readable medium of claim 8, where the one or more instructions, that cause the one or more processors to determine whether the protocol is unsupported by the device, cause the one or more processors to:
  determine that the device has not been configured to handle the protocol; and
  determine that the protocol is unsupported by the device based on determining that the device has not been configured to handle the protocol.

11. The non-transitory computer-readable medium of claim 8,
where the data is first data and the protocol is a first protocol, and
where the one or more instructions, when executed by the one or more processors, further cause the one or more processors to:
  receive second data destined for the second network device;
  identify a second protocol associated with the second data;
  determine that the second protocol is supported by the device; and process the second data based on the second protocol after determining that the second protocol is supported by the device.

12. The non-transitory computer-readable medium of claim 8, where the one or more instructions, when executed by the one or more processors, further cause the one or more processors to:
   record the data based on determining that the protocol is unsupported by the device,
   inspect the data based on determining that the protocol is unsupported by the device, or
   update a record using the data based on determining that the protocol is unsupported by the device.

13. The non-transitory computer-readable medium of claim 8, where the control information includes information identifying a rule, a routing policy, a security policy, or a load balancing policy associated with the protocol.

14. The non-transitory computer-readable medium of claim 8, where the action includes:
   transmitting the data to the second network device based on the control information, or
   transmitting the data to the destination identified by the control information,
      the destination being different from the second network device.

15. A method, comprising:
   receiving, by a first device, data from a second device,
      the data being destined for a third device;
   identifying, by the first device, a protocol, associated with the data, using a data structure that identifies protocols,
   determining, by the first device and by searching a data structure for a protocol identifier that identifies the protocol, whether the first device cannot communicate using the protocol;
   identifying, by the first device, control information when the first device cannot communicate using the protocol,
      the data being processed by the first device when the first device can communicate using the protocol, and
      the control information being associated with causing the first device to perform an action,
      the action being a particular action other than dropping the data; and
   performing, by the first device and when the first device cannot communicate using the protocol, the action based on the control information,
      the action being identified by the control information.

16. The method of claim 15,
   where determining whether the first device cannot communicate using the protocol comprises:
      determining that the first device cannot communicate using the protocol based on determining that the protocol is unsupported by the first device.

17. The method of claim 15, where performing the action comprises:
   transmitting the data toward at least one of:
      the third device,
      a fourth device that is different than the third device,
      an application of the third device or the fourth device,
      software of the third device or the fourth device, or
      a user interface associated with the third device or the fourth device.

18. The method of claim 15, further comprising:
   logging the data in association with performing the action.

19. The method of claim 15, where the control information includes information identifying a rule or a policy to apply to the data when the first device cannot communicate using the protocol.

20. The method of claim 15, where performing the action comprises:
   transmitting the data to the third device without using the protocol.

* * * * *